March 23, 1943.  C. E. SORENSEN ET AL  2,314,603
VEHICLE FRAME
Filed Jan. 11, 1940    2 Sheets-Sheet 1
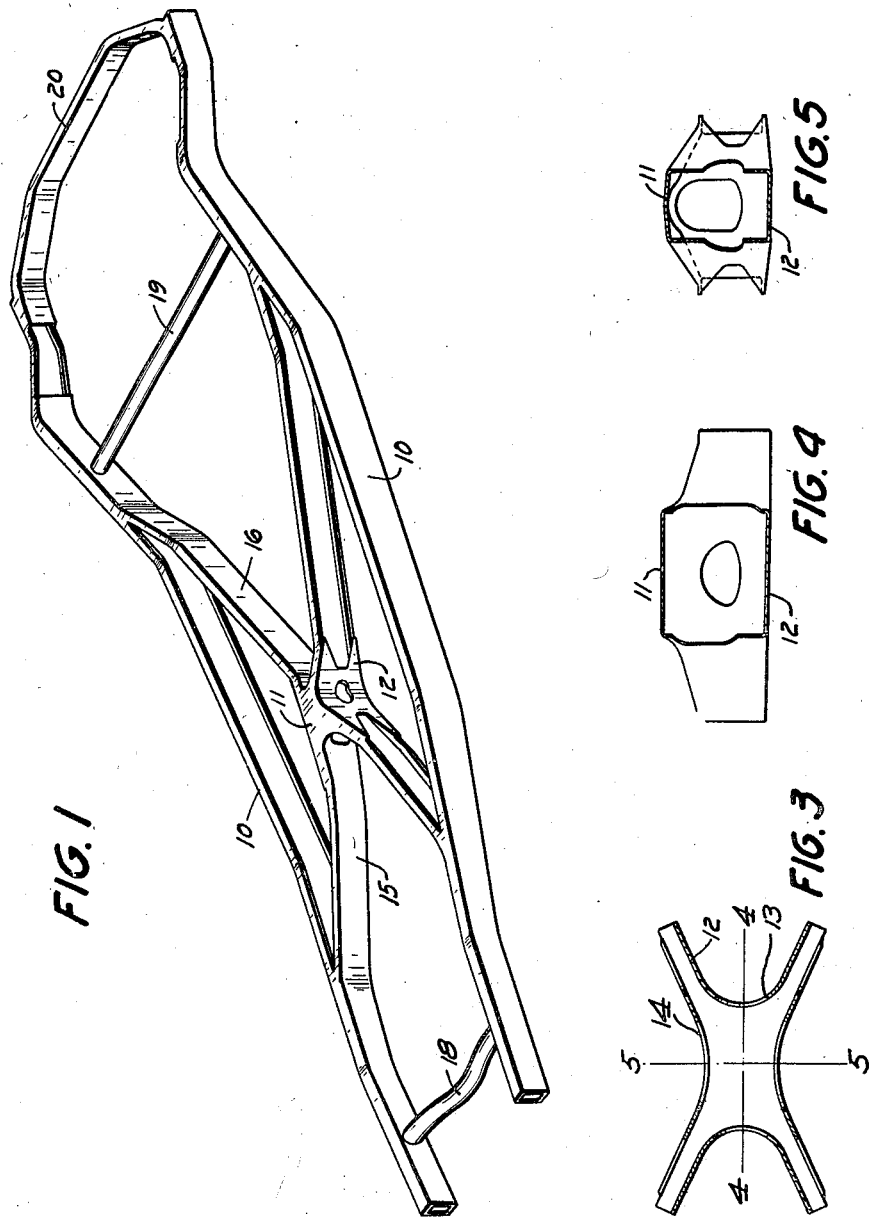
C. E. Sorensen
L. S. Sheldrick
INVENTORS,
BY Edwin C. McRae
E. L. Davis
ATTORNEYS.

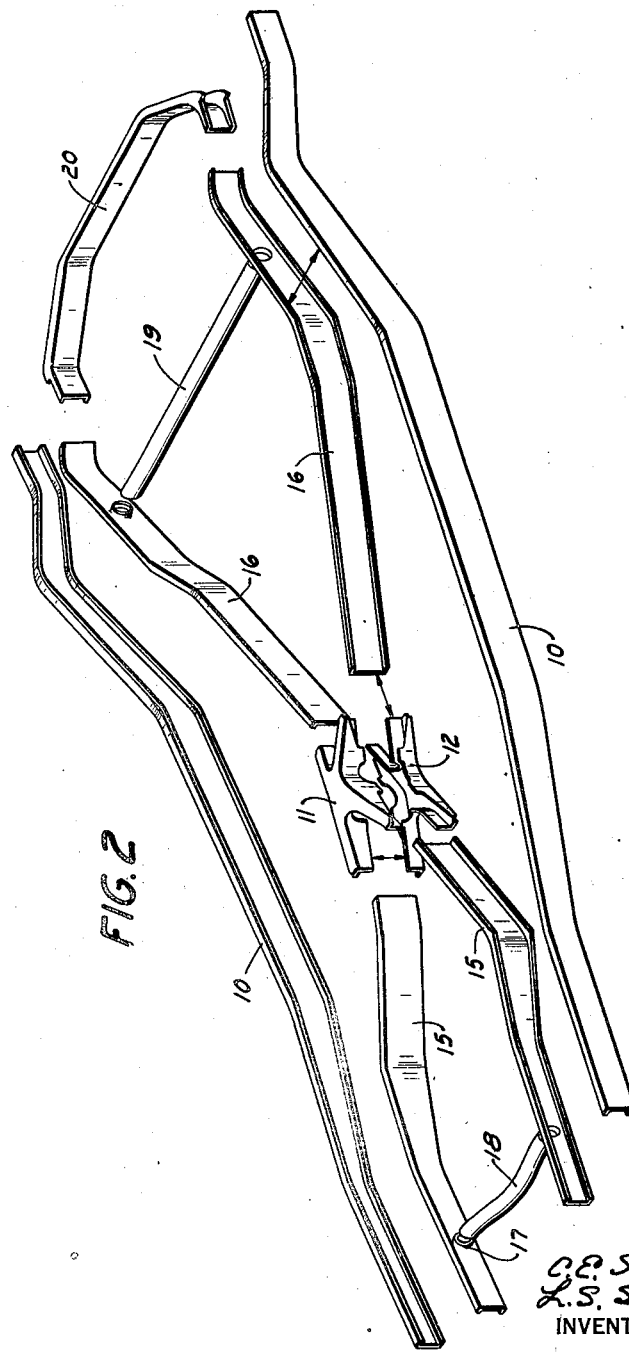

Patented Mar. 23, 1943

2,314,603

UNITED STATES PATENT OFFICE 2,314,603

VEHICLE FRAME

Charles E. Sorensen, Detroit, and Laurence S. Sheldrick, Dearborn, Mich., assignors to Ford Motor Company, Dearborn, Mich., a corporation of Delaware Application January 11, 1940, Serial No. 313,362

7 Claims. (Cl. 280—106)

The object of our invention is to provide an automobile frame of simple, durable and relatively inexpensive construction.

A further object of our invention is to provide an automobile frame which, in proportion to its weight, will provide increased resistance to twisting and binding stresses to thus provide a better supporting member for the automobile body which is mounted thereon.

High-speed operation of the modern motorcar develops relatively large stresses upon the opposite corners of the vehicle frame, and unless the frame is sufficiently resistant to twisting, these stresses are transmitted to the vehicle body. It is therefore the object of our invention to provide a frame which will offer maximum resistance to twisting and thus permit the use of a relatively lightweight body structure.

These objects are accomplished in our improved construction partly by the design of the individual parts and partly because these parts are all welded to each other to form a unitary frame construction.

It is therefore a further object of our invention to provide an automobile frame construction which is assembled entirely by welding, to not only eliminate the numerous operations heretofore required where the various members were riveted together but also, by eliminating all riveted joints, provide a cheaper construction to manufacture and one which is more rigid, durable and more uniform in production.

A still further object of our invention is to provide an automobile frame construction which is assembled from a plurality of individual parts by butt welding and which construction is so designed that the metal consumed as flash during the welding process does not cause distortion in the structure. Heretofore when the idea of welding the several frame members together to produce a unitary structure was considered, it was universally conceded that spot welding or arc welding would need be employed because the amount of metal consumed as flash in butt welding could only be obtained by bending the already welded parts. Such strains in the members could not, of course, be tolerated. Spotwelding has the disadvantage that the parts are only held together at intermittent points, the same as in a riveted construction; whereas, arc or gas welding is relatively costly. Our improved frame construction is believed to be unique in that the individual members are so designed that they may be butt-welded to each other and the shortening of the parts, due to the flashing away of the metal, will not require bending nor set up strains in the various members already united together or in those members being welded thereto.

With these and other objects in view, our invention consists in the arrangement, construction and combination of the various parts of our improved frame, as described in this specfication, claimed in our claims and illustrated in the accompanying drawings, in which:

Figure 1 is a perspective view of a completed frame.

Figure 2 is a perspective view showing the individual frame parts separated from each other at the points along which they are later welded together.

Figure 3 is a horizontal central sectional view through the box member that comprises the center portion of our improved frame.

Figure 4 is a sectional view, taken upon the line 4—4 of Figure 3, and,

Figure 5 is a sectional view, taken upon the line 5—5 of Figure 4.

Referring to the accompanying drawings, it will be noted that our improved frame is of the type commonly known as an X-type frame. In this type of frame side members are provided which are joined at each end by front and rear cross members, and other members extend diagonally from each corner to the diagonally opposite corner, these diagonal members intersecting at the center of the frame in box construction. This general arrangement of frame is quite old in the automobile industry, having been in common use for five years or more. However, earlier frame designs of this type have been limited in that the center point at which the diagonal members intersect was relatively weak structurally so that the maximum benefit of the diagonal members was not obtained. The main purpose of the diagonal members is to resist twisting of the frame and when such loads are being resisted the member subject to highest stress is the box member at the center of the frame. At such time each pair of diagonal members tends to pivot around the other pair through the center of the box member. The propeller shaft or torque tube of the chassis must extend through a longitudinal opening in the center of the box member and this opening must be of sufficient size that clearance is maintained between the propeller shaft and box member when the shaft is in either of its extreme positions, due to flexing of the vehicle springs.

With our improved frame construction a novel center box member is provided which permits the required clearance with the vehicle driveshaft while at the same time providing a rigid connection for the four diagonally extending members.

The reference numeral 10 is used to indicate the frame side members which are pressed from flat stock to channel cross section with the flanges extending inwardly toward the center of the car. A box member is formed at the center of the frame, this box member comprising upper and lower halves, numbered 11 and 12, respectively, each half being formed as a sheet metal stamping. The halves 11 and 12 are each X-shaped, a section through each of the arms of the X being L-shaped. In order to form the complete box member the two halves 11 and 12, placed with their edges abutting, are clamped in the respective jaws of a welding machine and then the edges are butt welded together to form a unitary box structure. The metal flashed away is compensated for by moving the halves closer together during the welding operation. The flanges on each half are so shaped that when welded together openings 13 are provided in the front and rear walls of the box structure while openings 14 are provided in the sides of the box member. The driveshaft of the vehicle is adapted to project through the openings 13. After the members 11 and 12 have been welded together each arm of the X-member will be of a channel shaped section.

A pair of front diagonally extending channel members 15 are adapted to then be butt-welded to the forward arms of the box member, while rear channel shaped members 16 are likewise adapted to be butt-welded to the rearwardly extending arms.

The front ends of the channel members 15 and the rear portions of the members 16 are each provided with circular flanges 17 which are pressed from the metal of the channel web and extend inwardly therefrom. A front tubular cross member 18 is butt-welded at its respective ends to the flanges 17 to form a sub-assembly, comprising the cross member 18 and the two rearwardly extending channels 15. A tubular rear cross member 19 is likewise butt-welded between the flanges 17 on the members 16. Thus, two triangular shaped sub-assemblies are formed which are adapted to be later welded to the front and rear arms of the center box member.

The front cross member assembly is now butt-welded to the two forward arms of the center box member and the rear sub-assembly is likewise butt-welded to the rear arms of the center box member. In compensating for the metal lost in flash by these welding operations the two sub-assemblies are moved toward the box member in a horizontal direction. This direction is perpendicular to the direction of movement in welding the box member together.

The two side members 10 are then moved into position along the respective sides of the completed X-member. The flanged end portions of each pair of members 15 and 16 are simultaneously butt-welded to the respective end portions of one side member 10 and one end of a bumper cross member 20. The cross member 20 is of channel section with outwardly turned flanges which are aligned with the flanges on the side members 10. The other side member is likewise welded in place. The compensating movement in this case is transverse, which is at right angles to the other two compensating movements. A rectangular shaped section is thus formed at each end of each side member which extends a considerable distance from the ends of the frame.

The important feature of this method of assembly is that when the box members 11 and 12 are butt-welded together, the metal consumed by flash is compensated for by vertical movement. The two sub-assemblies when being simultaneously or successively butt-welded to the arms of the center box member in no way stress or bend the parts already welded as the movement is longitudinal. When the side members 10 are butt-welded to the members 15, 16, and 20 only transverse movement occurs to compensate for the metal lost by flash.

Among the many advantages arising from the use of our improved construction it may be well to repeat that the sequence of operations consisting of forming the center box member by butt-welding two halves along a horizontal plane and then butt-welding a sub-assembly, comprising a cross member and two diagonal members to each end of the box member in two vertical planes, and then butt-welding side members to the adjacent front and rear portions of the aforementioned sub-assemblies in a transverse plane, insures that the reduction in area of the parts, due to the flashing, will not set up strains in the completed assembly.

A still further advantage results in that the unique box structure provided at the center of the applicants' frame is of rectangular cross section in the vertical, longitudinal, transverse and horizontal cross sections. It is well known that a complete rectangular box member offers the greatest resistance to twisting for the metal employed so that in this way maximum strength is attained. Furthermore, with this construction the use of rivets, gusset plates and the like are unnecessary.

Some changes may be made in the arrangement, construction and combination of the various parts of our improved device without departing from the spirit of our invention and it is our intention to cover by our claims such changes as may reasonably be included within the scope thereof.

We claim as our invention:

1. In a frame for motor vehicle, in combination, a pair of side members of channel section having their flanges disposed inwardly, a center box member comprising a pair of complementary elements having legs disposed in the form of an X, portions of said legs being of channel section, said elements being assembled with the corresponding channel flanges in edge to edge relationship and welded together, diagonal members of channel section having the flanges thereof disposed outwardly, the inner ends of said diagonal members abutting the ends of the respective legs of said center member in edge to edge relationship therewith and welded thereto, the outer portion of said diagonal members being aligned with said side members, the flanges of said side and said diagonal members being secured together to form a box through their area of contact, and cross members secured to said side members and said diagonal members to maintain the spacing thereof.

2. In a frame for a motor vehicle, a center box member comprising a pair of complementary elements, said elements having four extending legs disposed in the form of an X, portions of said legs being of channel sections, said elements being assembled with the corresponding channel flanges in edge-to-edge relationship and welded together to form enclosed supports, a pair of side members, diagonal members having their inner ends abutting the ends of the respective legs of said center member in edge-to-edge relationship therewith and welded thereto, said diagonal members having their abutting edges continuous over the adjacent weld seams between said elements, the outer ends of said diagonals being secured to said side members, and cross members securing said side members at the required spacings.

3. In a chassis frame having X-member portions projecting toward the center, a central tunnel element made of a pair of stampings flanged to provide channel sections presenting toward each other with the flanges welded to form a box section through the center of the element and through the base of projecting stubs, the ends of the stubs being of channel section the same as the X-member portion to which they are abutted and welded.

4. In a chassis frame having X-member portions projecting toward the center, a central tunnel element made of a pair of stampings flanged to provide channel sections presenting toward each other with the flanges welded to form a box section through the center of the element and through the base of projecting stubs, the ends of the stubs being of channel section the same as the X-member portion to which they are abutted and welded, the ends of the element along one axis having flanged openings forming a tunnel for a propeller shaft.

5. A chassis frame including, in combination, side sill elements, X-member portions secured thereto and projecting toward the center of the frame, cross braces interconnecting the joined portions of the side sills and X-member portions, and a central tunnel element having projecting stubs butt welded to the ends of the X-member portions, said tunnel portion being of central box section construction with the bases of the stubs also of box section construction with the end portions of channel section.

6. In a chassis frame having side sills and X member portions, the latter being of channel section and projecting toward the center, a top stamping flanged downwardly at the sides and ends to form projecting stubs of channel section, a bottom stamping flanged upwardly at the side and ends likewise forming projecting stubs of channel section with the flanges thereof aligned with the flanges of the stubs of the top stamping, said flanges of said stamping being butt welded together, the bases of said stubs being of box section while the ends of said stubs are of channel section and butt welded to the channel shaped ends of said X-member portions.

7. A chassis frame which embodies, an upwardly and a downwardly presenting stamping welded together to form a central tunnel element having four projecting stubs of box section having an outer wall cut away forming ends which are of channel shape, X-member portions of outwardly presenting channel shape butt welded to the channel shaped ends of said stubs, and sill elements of inwardly presented channel shape welded to the end portions of the X-member portions to form box section construction.

CHARLES E. SORENSEN.
LAURENCE S. SHELDRICK.